United States Patent
Ho et al.

(10) Patent No.: US 11,900,045 B2
(45) Date of Patent: Feb. 13, 2024

(54) SYSTEM AND METHOD FOR PROCESSING AN ACTIVE DOCUMENT FROM A RICH TEXT DOCUMENT

(71) Applicant: Roar Software Pty Ltd., North Sydney (AU)

(72) Inventors: Thao Minh Ho, Sydney (AU); Lawrence Xiang Yao, Homebush West (AU); Jeffrey Lin, Bardwell Park (AU); Ted Tsao, Sydney (AU); Kevin Liao, Sydney (AU)

(73) Assignee: Roar Software Pty Ltd., North Sydney (AU)

( * ) Notice: Subject to any disclaimer, the term of this patent is extended or adjusted under 35 U.S.C. 154(b) by 0 days.

(21) Appl. No.: 17/848,098

(22) Filed: Jun. 23, 2022

(65) Prior Publication Data
US 2023/0017878 A1    Jan. 19, 2023

(30) Foreign Application Priority Data
Jul. 16, 2021   (AU) ................................ 2021902197

(51) Int. Cl.
G06F 40/00    (2020.01)
*G06F 40/151*    (2020.01)
*G06F 40/106*    (2020.01)
*G06F 40/205*    (2020.01)

(52) U.S. Cl.
CPC .......... *G06F 40/151* (2020.01); *G06F 40/106* (2020.01); *G06F 40/205* (2020.01)

(58) Field of Classification Search
CPC ..... G06F 40/151; G06F 40/205; G06F 40/106
See application file for complete search history.

(56) References Cited

U.S. PATENT DOCUMENTS

| | | | |
|---|---|---|---|
| 6,336,124 B1 * | 1/2002 | Alam | G06F 40/151 715/205 |
| 7,251,777 B1 | 7/2007 | Valtchev et al. | |
| 8,762,556 B2 * | 6/2014 | Priyadarshan | G06F 40/106 709/227 |
| 9,098,474 B2 * | 8/2015 | Lockhart | G06F 16/258 |
| 11,048,864 B2 * | 6/2021 | Rastogi | G06F 40/169 |
| 2006/0259456 A1 | 11/2006 | Falk et al. | |
| 2014/0181640 A1 | 6/2014 | Sun | |

(Continued)

*Primary Examiner* — Barbara M Level
(74) *Attorney, Agent, or Firm* — Kaplan Breyer Schwarz, LLP

(57) ABSTRACT

The present invention relates to a system for converting a rich text document into an active document suitable for consumption on a particular device system, or operating system by human or machine. The system comprises a server including a non-transitory non-volatile storage medium. The non-transitory non-volatile storage medium is adapted to store at least rich text documents and active documents that have been converted from a rich text document format into an active document format. The server is adapted to carry out the steps of: scanning and parsing the rich text document to extract structural elements and contents; scanning and parsing the rich text document to extract embedded metadata; connecting structural elements and contents with the extracted metadata and the rich document to form a render data set; and sending the render data set to a configurable render module that outputs at least one active document.

13 Claims, 5 Drawing Sheets

(56) References Cited

U.S. PATENT DOCUMENTS

| | | | |
|---|---|---|---|
| 2017/0139875 A1* | 5/2017 | Kamata | G06F 16/1794 |
| 2017/0344526 A1* | 11/2017 | Smith | H04L 63/104 |
| 2019/0213342 A1* | 7/2019 | Acharya | H04L 9/0894 |
| 2019/0251142 A1* | 8/2019 | Gagné-Langevin | G06F 40/226 |
| 2022/0156418 A1* | 5/2022 | Xu | G06F 30/27 |

\* cited by examiner

SYSTEM AND METHOD FOR PROCESSING AN ACTIVE DOCUMENT FROM A RICH TEXT DOCUMENT

CROSS-REFERENCE TO RELATED APPLICATION

This application claims priority to Australian Innovation Patent 2021902197, filed on 16 Jul. 2021, which is fully incorporated by reference herein.

TECHNICAL FIELD

The present invention relates to a data transformation system. More particularly, the present disclosure relates to system and method for processing a rich text document into one or more active documents and managing the communication of information contained within the rich text documents to targeted people or organisations through corresponding active documents.

BACKGROUND

Rich text document describes a document that is typically created using word processing or text editing software, such as Microsoft™ Word, OpenOffice Writer, Google™ Docs, Apple™ Pages, GNU TeXmacs. A rich text document may contain, but is not limited to, paragraphed text together with typesetting, figures, tables, and styling. Such a document may be saved as a file on a computer in various formats. Examples of rich text document formats include, but are not limited to, plain text, CommonMark, HTML, RTF, Tex, LaTex, Microsoft Word ".docx", and PDF.

A rich text document may be converted into one or more active documents. An active document may be simultaneously realised in a range of formats such as a PDF, a postscript, several related Web pages grouped together as a Web site, a video presentation, a cloud application programming interface (API), or any other suitable format or an amalgamation of one or more of the possible formats that may be read by human or machine. The information carried in the various formats of an active document may be the same or at least consistent, so that they reflect and correlate with the information stored in the source rich text document which is used to create the active document.

Software applications currently exist which can convert a rich text document into another document format. For example, a word processor may open a Microsoft™ Word document and convert it to a portable document format PDF document. However, to convert a rich text document into multiple other document formats typically involves using multiple software applications and performing multiple conversions, which typically takes a significant amount of time and introduces complexity in handling the multiple separate document formats.

Further, certain document formats can be difficult to output on a digital display, commonly resulting in misaligned or visually displeasing formatting. This can lead to bad user experience with an application or website and user dissatisfaction. For example, PDF documents typically do not present well on a Web browser when compared to HTML content, especially when viewed on mobile devices.

Other issues and time delays can arise when converting a rich text document for interactive viewing, and even more so when adapting a document for viewing on multiple devices or by multiple users with different privileges.

U.S. Pat. No. 7,251,777 discloses a method and system for automated structuring of textual documents. That system is adapted to implement a customizable schema-guided conversion of plain-text documents, rich-text documents and textual data records to an XML-compatible structured form. The system makes substantial use of element content model definitions from a chosen target XML schema/DTD to optimize, closely guide, and disambiguate element pattern matching and recognition. Highly granular structure can be inferred, in best possible conformance with the schema. One embodiment operates based on a finite state machine derived via recursive aggregation of the schema element content models. Additionally, disclosed is a method for automated document structuring within the environment of an XML-enabled word processor application. The method entails using the host's API to perform element pattern search and matching and to apply markup to the document in accordance with the inferred XML structure. A GUI framework integrated in the word processor workspace can be provided for developing and executing document conversion/structuring definitions. However, this system focuses on converting a document with a rich text format to another format, but it failed to provide a method for handing multiple different output formats in a single active document.

US Patent Application No. 20060259456 discloses a system for describing text file formats in a flexible, reusable way to facilitate text file transformations. Such system provides a text file schema that enables any text file to be converted to an XML or database format, or vice versa. The text file format is expressed as a set of external files that define the file format in a flexible, reusable way. The external files conform to a given XML schema and the external files comprise a first external file that describes the text file configuration according to the schema, a second external file that describes the structure of the text file according to the schema, and a third external file that describes control data of the text file according to the schema. However, this system focuses on converting a document with a rich text format to another format, but it failed to provide a method for handing multiple different output formats in a single active document.

US Patent Application No. 20140181640 discloses a method for structuring document contents includes: generating a first instantiating rule corresponding to a first document based upon a first schema file with a style, which is a preset style, and a first XML file with a rule, which is a first structuring rule, in the first document; obtaining a first list of tags corresponding to structured first contents in the first document based upon a first tag structure tree of the first contents; obtaining M texts matching the first instantiating rule from discrete contents corresponding to the first list of tags, wherein the discrete contents are unstructured contents excluded from the structured first contents; determining N tags which can match the structured first contents among M tags corresponding to the M texts; and structuring N texts corresponding to the N tags based upon the N tags to obtain a second tag structure tree. Similarly, this system focuses on converting a document with a rich text format to another format, but it failed to provide a method for handing multiple different output formats in a single active document.

Any discussion of the prior art throughout the specification should in no way be considered as an admission that such prior art is widely known or forms part of common general knowledge in the field.

SUMMARY OF THE INVENTION

Problems to be Solved

It may be an object of the present invention to provide a system for converting rich text documents into active documents.

It may be an object of the present invention to provide a system for the management of rich text documents, their corresponding active documents, and the communication of information contained within the rich text documents to targeted people or organisations through corresponding active documents.

It may be an object of the present invention to provide a system or process for automatically adjusting an output display of rich text document content based on a viewing device screen size.

It may be an object of the present invention to provide a system or process for rendering information into an internet application.

It is an object of the present invention to overcome or ameliorate at least one of the disadvantages of the prior art, or to provide a useful alternative.

Means for Solving the Problem

A first aspect of the present invention may relate to a system for converting a rich text document into at least one active document suitable for consumption on a particular device system, and/or operating system by human or machine, the system comprising:
- a server including a non-transitory non-volatile storage medium;
- the non-transitory non-volatile storage medium adapted to store at least one rich text document and at least one active document that has been converted from a rich text document format into an active document format;
- wherein the server is adapted to carry out the steps of:
  - scanning and parsing the rich text document to extract structural elements and contents;
  - scanning and parsing the rich text document to extract metadata;
  - connecting structural elements and contents with the extracted metadata and the rich document to form a render data set;
  - sending the render data set to a configurable render module that outputs at least one active document.

Preferably, a rich text document is a document file created using a word processing or text editing software.

Preferably, the active document is realised in one or more of a range of formats, including PDF, several related Web pages grouped as a Web site, a video presentation, a cloud application programming interface (API), or any other suitable format or an amalgamation of one or more of the possible formats.

Preferably, the structural elements comprise one or more paragraphs, headings, bullet lists, number lists, hyperlinks, images, multimedia, mathematic equation, chemical structure, charts, tables, table rows, and table cells.

Preferably, the structural elements, contents, and metadata are stored as one or more internal data model (IDM) data sets.

Preferably, the extraction of structural elements step is adapted to be configurable so that certain rich text document structures or elements are skipped and do not end up in the IDM data set.

Preferably, the metadata is embedded in the rich text document.

Preferably, the metadata comprises one or more metadata that is defined by a person who authored or edited the rich text document.

Preferably, the metadata is in free-form and used to provide a richer description of the rich text document structure or contents.

Preferably, the connecting step comprises the combination of the rich text document itself with the IDM data set to form a render data set.

Preferably, the render module is adapted to accept a render data set and processes it into one or more active documents.

Preferably, the render module is configurable to define one or more available output active document formats and possesses the transformation logic to convert a render data set into each of the available output formats.

Preferably, the render module is adapted to be configured by a user.

Preferably, the render module comprises a render module configuration for specifying one or more desired output formats for render data sets.

Preferably, the render module is adapted to maintain a system-level configuration and multiple document-level configurations, such that there exists one document-level configuration for each render data set.

Preferably, the render module comprises default configuration values stored in a system-level configuration.

Preferably, the render module is configurable so as to generate multiple active documents, where each active document may be realised by multiple formats.

Preferably, the render module is configurable so as to allow aspects of a rendering process to be altered.

Preferably, the server is adapted to allow an authorised user to create one or more permanent sessions therein.

Preferably, one or more rich text documents can be added to the permanent session by the authorised user.

Preferably, a rich text document added to a permanent session may be marked by the authorized user as a revision of another rich text document already in the permanent session.

Preferably, the permanent session is adapted to maintain all revisions of a rich text document as a version history.

Preferably, a rich text document in a permanent session is related to one or more corresponding active documents converted by the server from that rich text document, wherein the permanent session retains the original rich text documents and maintains a link between a source rich text document and its corresponding active documents.

Preferably, the server is adapted to allow an authorised user to create one or more casual sessions to communicate information contained in a permanent session's rich text documents to other users.

Preferably, the server is adapted to allow an authorised user to configure and control access permissions of the one or more casual sessions created by the authorised user.

Preferably, the server is adapted to generate and assign a unique address to a casual session.

Preferably, the unique address is a unique internet address.

Preferably, the unique address is embedded in an email or SMS, so that it may be communicated to the relevant users of a casual session.

Preferably, a casual session is associated with one or more privileged users, wherein an authorized user who creates a casual session is identified as the session's first privileged user, and any other privileged users are identified as subsequent privileged users.

Preferably, the server is adapted to allow one or more privileged users to access casual sessions directly through a server interface.

Preferably, the server is adapted to authenticate an unprivileged user before allowing restricted access to a casual session, wherein the user is authenticated by any one or more of password, security question, personal details, or biometrics.

Preferably, the server is adapted to enable a privileged user to customize display elements in the various formats of an active document, wherein the customize display elements comprise one or more of display colour, font style, layout of major display elements, pop over positions, transparency level.

Preferably, the server is adapted to allow a rich text document to be downloaded in a casual session as a read-only document.

Preferably, the server is adapted to enable users in a casual session to attach annotations to any visual element of an active document display.

Preferably, the server is adapted to support restricting the creation of annotations to privileged users.

Preferably, the server is adapted to control the order in which multiple active documents' contents are presented in a casual session.

Preferably, the server is adapted to allow privileged users to set up pre-conditions or questions which a user is required to satisfy before accessing the entire or parts of an active document.

Preferably, the server is adapted to allow a privileged user to create display components and logic components linked to a pre-condition or question that augments active documents within a casual session.

Preferably, the display components appear as visual elements blending in with other visual elements in an active document display.

Preferably, the logic component is adapted to determine whether the entire or part of an active document is in a closed or open state, wherein the close state prevents visual elements that normally appear in and after the part of an active document from being shown or accessed.

Preferably, the pre-conditions or questions comprise any one or more of viewing of mandatory text, viewing of mandatory figure, viewing of mandatory video, completing one or more multiple choice questions, number input questions, and free text input questions.

Preferably, the server is adapted to store state data of a casual session for state transitions through multiple states to support business processes.

Preferably, the casual session state data comprises the state of any one or more of Ready, Wait for Client, Review, Client Confirmed, or Completed.

Preferably, the server is adapted to allow a privileged user to configure a casual session by attaching various actions to one or more pre-conditions, questions, or specific state transitions, such that the actions are triggered by one or more pre-conditions or questions being satisfied, or transitions in specific states.

Preferably, the actions comprise any one or more of sending notification, controlling access, highlighting active document, or changing casual session states.

Preferably, the server is adapted to track progress of unprivileged users, who access a casual session through its unique internet address, in terms of reading through active documents in the casual session and relay the progression data to privileged users.

Preferably, the progression data comprises any one or more of current active document, visual elements viewed, duration on viewing visual elements, pre-conditions or questions satisfied by a user, number of tries in satisfying pre-conditions or questions, state transitions, a summary of annotations created, and the number of times that one or more documents have been downloaded.

Preferably, the server is adapted to continuously collect progression data for a casual session and present a snapshot of the data to privileged users when requested.

Preferably, the server is adapted to send the progression data to an external system such as a data lake for further processing and use in external systems.

Preferably, the server is adapted to present the progression data to privileged users in the form of one or more dashboards in a casual session.

Preferably, the dashboard is adapted to contain an arrangement of tiles that each displays a subset of the overall progression data.

Preferably, the tiles may only be showing summary data using charts, tables, or figures and may have hyperlinks that when activated transitions the dashboard into another view that drills into the details of the subset of data displayed by the tile.

Preferably, the server is adapted to generate a playback simulation of activities made by an unprivileged user from the progression data.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

Some advantageous effects shall arise from the multiple format realisations of an active document. In particular an active document's multiple formats allow a server to quickly respond to concurrent requests to consume the information held in the active document, typically replying within seconds to each request with a response that most appropriately presents the document's information on the request's target device. For example, if an active document is realised as an amalgamation of a PDF document, several related Web pages grouped together as a Web site, a video presentation, and a cloud API, then a server with the active document can quickly respond to simultaneous end-user requests to: (1) download the document for printing to paper (most appropriate format is PDF); (2) read the document on a notebook PC using a Web browser (most appropriate format is Web site and/or video); and (3) read the document via a mobile app client (most appropriate format is cloud API and/or video).

Another possible benefit of an active document's multiple formats is a server with an active document is able to quickly respond to simultaneous requests for information initiated by humans and machines. In the case of responding to machine requests, active document formats such as cloud API and video presentation may be machine-processed extremely efficiently by the requester compared to the more typical presentation formats such as HTML and PDF, thereby reducing processing overheads incurred by machine clients.

The present invention's aim to efficiently support machine-readable access to active documents further optimizes certain use cases. For example, the PDF format of active documents readily facilitates the high fidelity transfer of documents into an external archival system for long term storage. Another example is that the cloud API format of active documents can facilitate the efficient transfer of selected document information into an external data lake for trend analysis, customer profiling, and other machine learning or data analysis operations.

The present invention's design around permanent and casual sessions promotes reduced running costs when a system embodying the design is realised in a typical cloud computing environment. Specifically, server storage and related computing resources allocated to permanent sessions, which store rich text documents and their corresponding active documents, are long lasting and cannot be easily reclaimed. However, casual sessions are designed to be created and destroyed often so that storage, hardware, and other computing resources associated with a casual session can be quickly recycled or relinquished when the casual session is destroyed. Relinquishing computing resources associated with destroyed casual sessions will save on server running costs, especially in pay-as-you-go cloud computing environments. A casual session can be destroyed when access to the documents within it by targeted unprivileged users is no longer required. Privileged users will retain access to the original rich text documents and active documents in permanent sessions, so that they may create a new casual session with the same documents if unprivileged users require access to the documents again.

DESCRIPTION OF THE INVENTION

Preferred embodiments of the invention will now be described with reference to the accompanying drawings and non-limiting examples.

Figure 1:
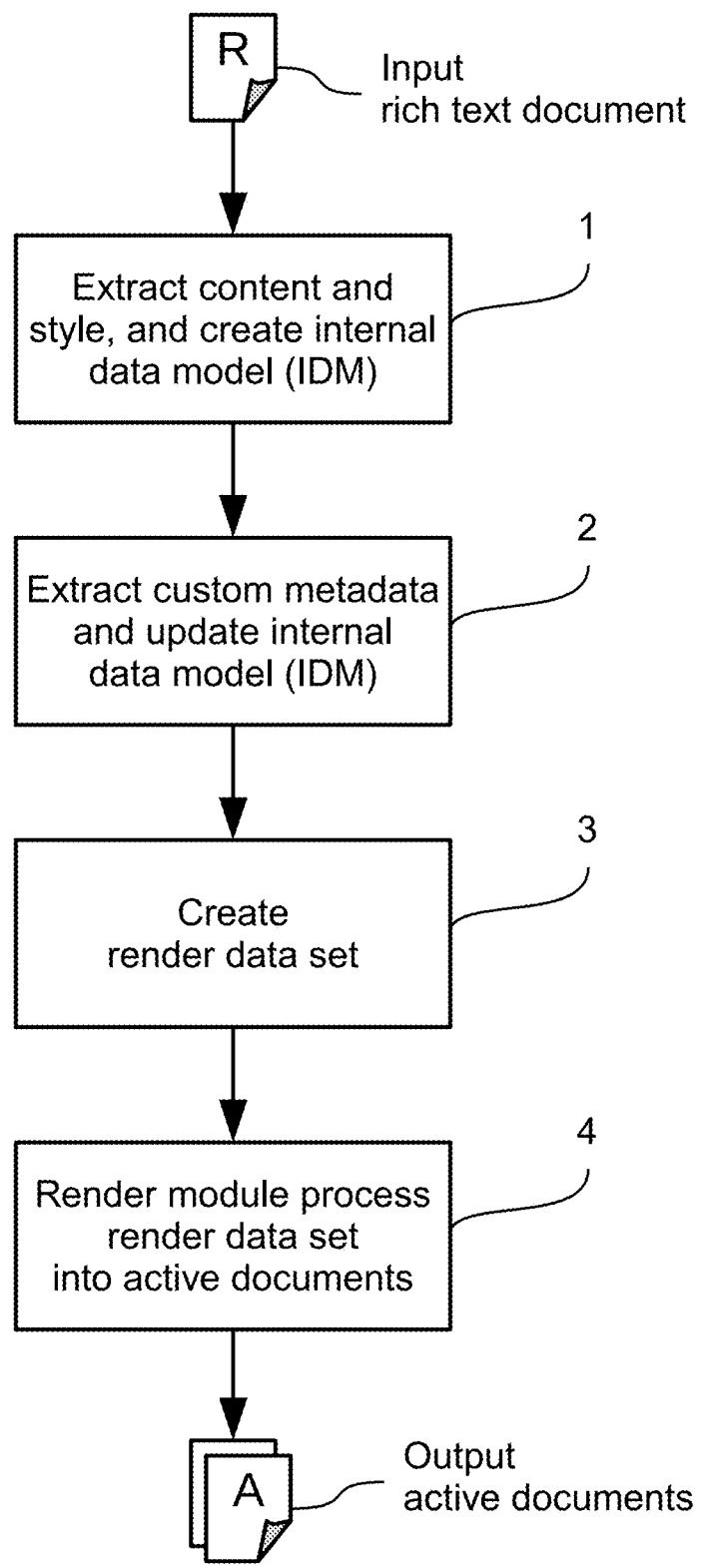
FIG. 1 is a block diagram showing a system or method for converting a rich text document to one or more active documents according to an embodiment of the present invention.

In one embodiment of the present invention, there is provided a process in which a rich text document is converted into at least one active document that involves several steps that are illustrated in FIG. 1. First, content and structure of the rich text document are obtained by scanning the entire document. Text content such as paragraphs, headings and captions are extracted together with their associated style attributes and stored based on the document structure. Second, the document is scanned again to extract any custom metadata related to extended mark up, additional styling and presentation. Third, everything extracted so far is correlated and connected to form a render data set. Fourth, this render data set is then sent to a configurable render module that outputs at least one active document.

In another embodiment of the present invention, there is provided a system for converting a rich text document into at least one active document suitable for consumption on a particular device system, and/or operating system by human or machine, the system comprising a server including a non-transitory non-volatile storage medium. The non-transitory non-volatile storage medium adapted to store at least one rich text document and at least one active document that has been converted from a rich text document format into an active document format. The server is adapted to carry out the steps of scanning and parsing the rich text document to extract structural elements and contents; scanning and parsing the rich text document to extract metadata; connecting the structural elements and contents with the extracted metadata and the rich document to form a render data set; and sending the render data set to a configurable render module that outputs at least one active document.

The following describes the details of the steps illustrated in FIG. 1. The first step involves scanning a rich text document to extract its structure and contents. Structural elements identified by this process include font, paragraphs, headings, bullet lists, number lists, hyperlinks, images, multimedia, mathematical equations, chemical structures, charts, tables, table rows, and table cells. After these structures are identified, their content and styling are extracted including elements such as text, tables, charts, images and their style attributes. The system constructs an internal data model (IDM) data set to store the extracted data. For example, if the rich text document contained a figure followed by a chart, then the figure's image bitmap data and style attributes will be extracted and stored in the IDM data set; the chart's series values and colour scheme will also be extracted and stored in the IDM data set and positioned after the figure's data. The scanning process may be configurable so that certain rich text document elements are skipped and do not end up in the IDM data set. In one embodiment, the scanning may include parsing the rich text document. In another embodiment, the user may configure the scanning process to filter out certain structural elements.

In the second step, the rich text document is scanned again to extract custom metadata embedded in the document. Custom metadata is typically defined by persons who authored or edited the document. This metadata is typically free-form and used to provide a richer description of the document structure or its elements. In one embodiment where the system processes a rich text document in the form of a Microsoft Word document, custom metadata may be specified as Microsoft Word Content Controls, which may be applied as mark up to document elements such as text, paragraphs, headings or tables. Example uses of Content Controls on text include marking words as keywords for search purposes, marking a line of text as a heading even though it isn't formatted as a heading in Microsoft Word, or marking a paragraph as "must read" for use in Gates, described later in the second aspect of this invention. Custom metadata extracted in this step is added to the IDM data set. The metadata may include security information such as a hash of the rich text document or digital signature.

Figure 2:
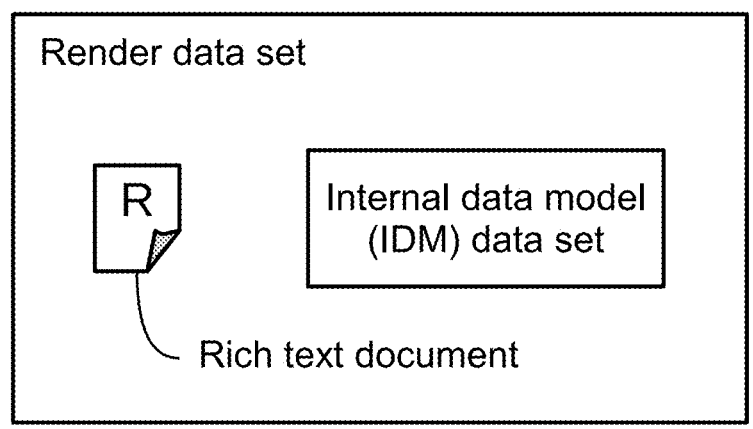
FIG. 2 a schematic diagram describing a render data set of the block diagram of FIG. 1.

In the third step, the rich text document itself and the IDM data set are combined into a render data set as shown in FIG. 2. This render data set is then sent to the system's render module to initiate the next step of the process.

The fourth step involves the system's render module, which accepts a render data set and processes it into one or more active documents. The render module defines the available output active document formats and possesses the transformation logic to convert a render data set into each of the available output formats. The render module may be configured by users; it maintains a system-level configuration and multiple document-level configurations, so that there may be one document-level configuration for each render data set. A render module configuration specifies the desired output formats for render data sets. Default configuration values may be stored in the system-level configuration so that they may be used if a render data set has no document-level configuration specified. Document-level configuration settings override those in the system-level configuration for a particular render data set.

In one embodiment of the system where a rich text document is a Microsoft Word document, it may be that the render module has three available output active document formats for every render data set: output as a PDF document, output as Web pages, and output as an application programming interface (API). The transformation logic to convert a render data set into a PDF document may involve standard processes to create a PDF document from a Microsoft Word document, noting that the rich text document (which is a component of the render data set) is a Microsoft Word document. To convert a render data set into Web pages, the render module may create HTML elements from IDM data set elements using a mapping like the one shown in Table 1. To create an API from a render data set, the render module may expose the IDM component of the render data set via a set of pre-packaged Web service endpoints. The render module's system-level configuration may by default turn on all three output formats. So, when using the system-level configuration to process a render data set, the render module will produce an active document simultaneously realised in three formats, namely a PDF document, Web pages, and an API. As an example, this active document may be used by a chat service or chatbot, such as Signal, Telegram, Microsoft™ Teams, Facebook™ Messenger, WhatsApp, WeChat, etc. If the chat service wishes to embed the active document for sending as an attachment, it can make use of the PDF document format of the active document; if it wishes to analyse the contents of the active document, it can make use of the API format, which can be more efficiently processed by the chat service than the PDF document or the Web pages formats.

For a particular render data set, users may wish to restrict the render module's output formats to PDF and Web pages only, in which case they will have to create a document-level configuration for this render data set in the render module to override the system-level configuration settings.

TABLE 1

| Rich text document element | HTML element |
| --- | --- |
| Paragraph | p |
| Heading | h1, h2, h3, etc. |
| Bullet list | ul |
| Number list | li |
| Hyperlink | a |
| Chart | svg (vector graphics rendered chart) |
| Picture | img |
| Table | table |
| Table row | tr |
| Table cell | td |
| Section | body (new HTML file) |

The render module's configuration may alternately specify that a render data set should output multiple active documents, where each active document may be realised by multiple formats. For example, section breaks in a Microsoft Word rich text document may be used to divide the output into separate active documents. Each active document may be simultaneously realised in three formats: a PDF document, Web pages, and a Web services API. For the Web pages output format, top-level headings may be used to divide the output into multiple HTML files.

In addition to controlling output formats, a render module configuration may also alter other aspects of the rendering process. For example, when creating a PDF document from a render data set, a configuration may specify the set of allowed fonts and a font substitution table to ensure the PDF document follows a company's branding requirements. When outputting Web pages, a configuration may apply cascading style sheets to show all heading paragraphs in red. Rendering configuration may also tap into custom metadata in the IDM data set from the second step of the conversion process. The custom metadata may alter the rendering of output elements such as those listed in Table 1 in various ways depending on values defined on corresponding rich text document elements. For example, a non-heading line of text in a rich text document may be rendered as a heading if it is marked with a specific custom metadata value.

In another embodiment of the system where a rich text document is a Microsoft Word document, it may be that the render module has three available output active document formats for every render data set: output as short message service format, output as an email, and output as a non-fungible token (NFT). The transformation logic to convert a render data set into SMS format may involve stripping all structural elements and separating the text into one or more 160 7-bit characters (140 octets) sections. This format of active document may directly output to a short message service to be sent out. To convert a render data set into an email, the render module may create sendmail elements from IDM data set elements using a mapping. The resulting active document may be directly piped to a sendmail server. In one embodiment, to create an NFT from a render data set, the render module may deploy an instance of a smart contract. The render module converts the render data set to one or more file formats such as portable text format, jpeg format, or mpeg format. The render module then mints an NFT from the file which returns an id of the new token, some metadata, and as URI to the file used for the NFT asset. In this example, the system is designed for an embedded system, where the rich text document can be efficiently converted and forward to a number of other devices.

Another embodiment of the present invention may relate to a system for the management of rich text documents, their corresponding active documents, and the communication of information contained within the rich text documents to targeted people or organisations through corresponding active documents. In one embodiment illustrated in FIG. 3, a system 10 is configured with one or more authorized users. Authorized users can create one or more permanent sessions that are stored within and managed by the system. In one embodiment, the permanent sessions are stored in a storage means that is at least one of a non-volatile storage medium and a cloud. In system 10, an authorized user of the permanent session 20 can add one or more rich text documents to the session. A rich text document may be added to a permanent session by various means such as uploading an appropriate file stored locally on a computer to the system or transferring a file over a network from a cloud storage provider's system. An authorized user can repeatedly add more rich text documents to the same permanent session and identify them either as new rich text documents or revisions of existing rich text documents already in the permanent session. In the case of permanent session 20, it contains five rich text documents that have been added: rich text documents 101, 201, 301, 302, and 401. The rich text document 302 has been added as a revision of rich text document 301. The system maintains a version history for each rich text document in the permanent session. Such version histories may be useful as a record or audit trail of how information contained within rich text documents has evolved over time.

For every rich text document added to a permanent session, the system 10 may process the rich text document into at least one corresponding active document. The means by which a rich text document is converted into at least one active document is described in the first aspect of this invention. For permanent session 20, rich text document 101 has been converted into active document 111, while rich text document 201 has been processed into two active documents 211 and 212. In the case of rich text documents 301 and 302, they each convert into a corresponding active document, resulting in active documents 311 and 312, respectively. Rich text document 401 currently has not been converted into any active documents. However, its conversion may be triggered at a later time, for example, in response to a user command. The system retains the original rich text documents and maintains the link between a source rich text document and its corresponding active documents.

To communicate the information contained in a permanent session's rich text documents, an authorized user can create one or more casual sessions and add them to the permanent session. In system 10, two casual sessions 30 and 40 have been added or linked to permanent session 20. Authorized users can then configure the added casual sessions to allow access to certain users only (where these users may be from anywhere in the world, they do not need to be authorized users of the system) or allow unrestricted access for the general public. When creating a casual session, the system associates with it a unique internet address (e.g., a URL) that is used to access the casual session. For an unrestricted casual session, its unique internet address may be published on a well-known Web site to allow public access. For a restricted access casual session, the system may offer to email or SMS the unique internet address to those users being granted access. In one embodiment, the casual session may be stored in a storage means that is at least one of a volatile storage medium and a local device. An authorized user who creates a casual session becomes the session's first privileged user. Other authorized users (not necessarily belonging to the same permanent session) may also be added as privileged users of the same casual session by the first privileged user or subsequent privileged users. Privileged users, being authorized users of the system, access casual sessions directly through the system; specifically, they do not access a casual session via its unique internet address. They may directly access the casual session through a server interface. They may be subjected to the system's authentication and authorization requirements.

Unprivileged users of a casual session are those who access the casual session through its unique internet address. For a restricted access casual session, casual authentication requirements apply to unprivileged users. Examples of casual authentication requirements include requiring users to produce a correct password or correctly provide some of their personal details such as date of birth before access is allowed. After satisfying any casual authentication requirements set up for the casual session by a privileged user, an unprivileged user will be allowed to interact with the casual session. For an unrestricted casual session, anyone who attempts to access the casual session via its unique internet address becomes an unprivileged user and will be granted access without any authentication or authorization. A privileged user may also configure the casual session to collect limited identity information from anonymous unprivileged users such as their name or alias. Note that if a privileged user attempts to access a casual session via its unique internet address (e.g., as part of testing), then they will be treated as an unprivileged user.

An important function of a casual session may be to allow unprivileged users to consume contents of active documents thereby receiving communication of the information originally contained in corresponding rich text documents. Privileged users of a casual session will typically add one or more rich text documents to the casual session, their corresponding active documents are also added automatically. The documents must be from the permanent session that the casual session is added to (or is linked to). In the embodiment of system 10 shown in FIG. 3, rich text documents 101 and 201 have been added to casual session 30, while rich text documents 301 and 302 have been added to casual session 40. The rich text document 401 has not been added to any casual session.

The advantage of presenting active document content to unprivileged users instead of presenting the corresponding rich text document content is that an active document supports multiple representations in different formats, which potentially enables the content to be consumed in a much more interactive and more understandable manner compared to a rich text document. Active documents can potentially help unprivileged users to absorb information in the contents more easily, more quickly and more confidently. Because active documents are created from corresponding rich text documents, understanding the information in active documents shall also imply an understanding of the information contained in the corresponding rich text documents.

Figure 3:
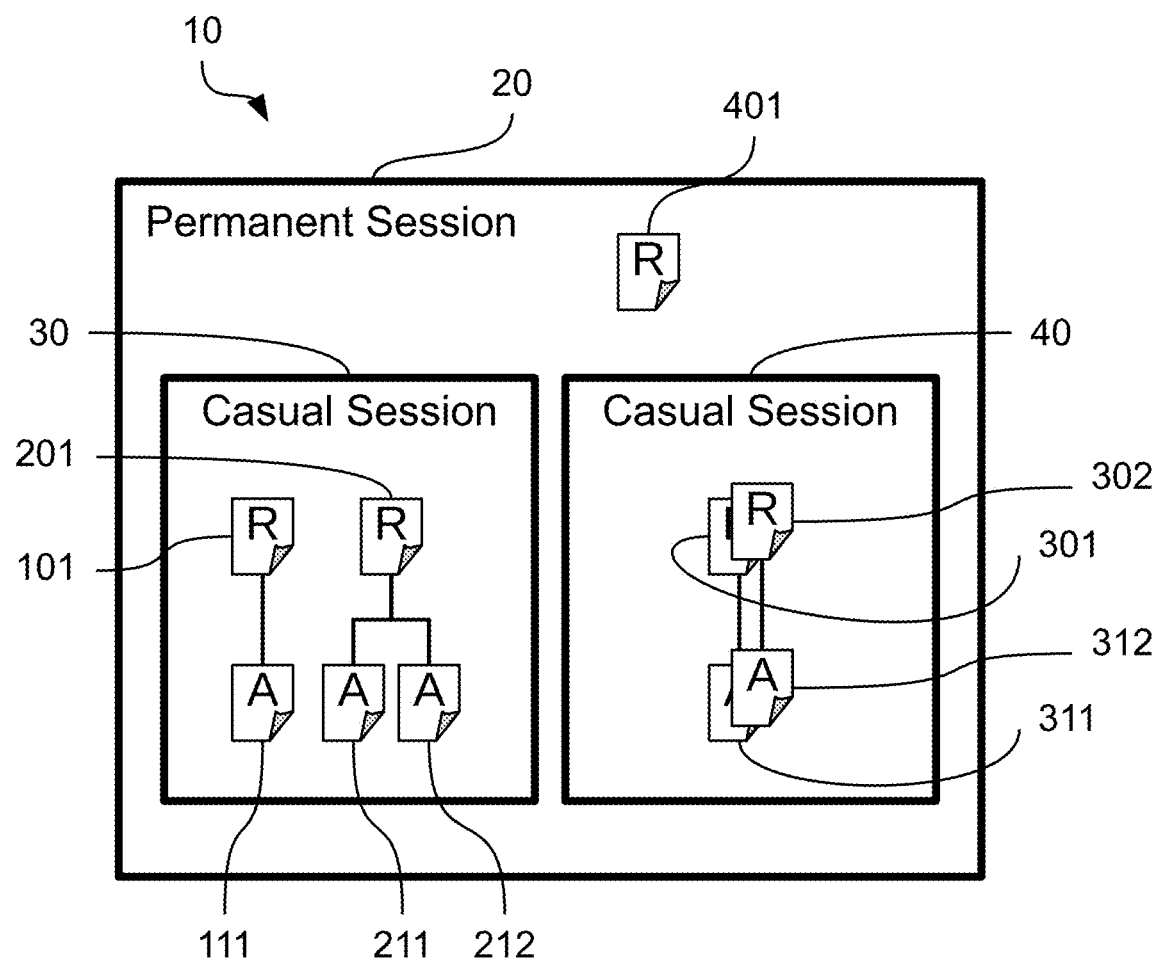
FIG. 3 is a schematic diagram of a system for the management of rich text documents and active documents according to another embodiment of the present invention.
Figure 4:
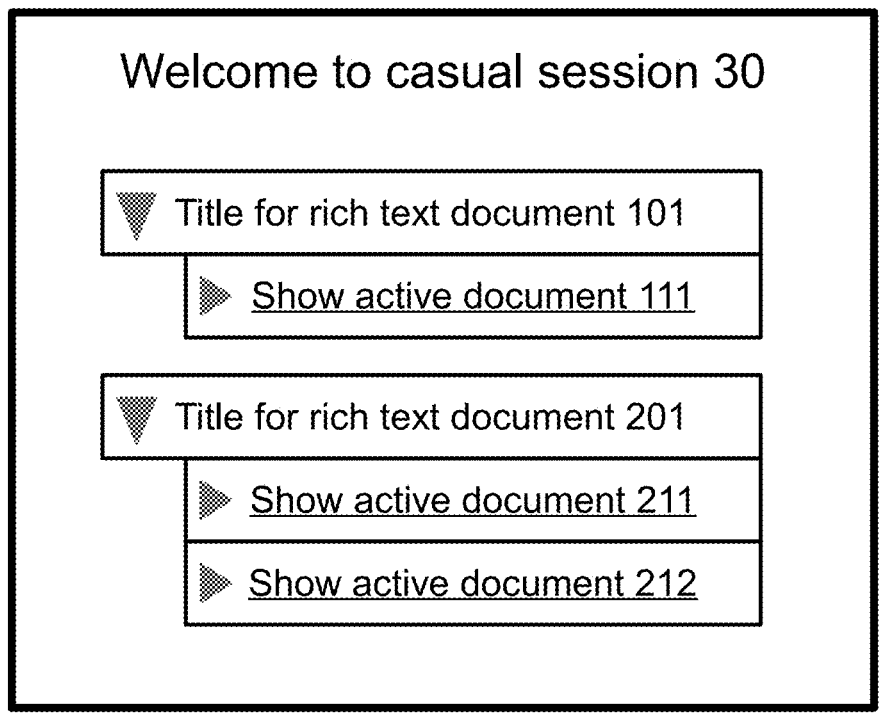
FIG. 4 is a schematic diagram of a menu for controlling rich text documents and active documents of an embodiment of the present invention.
Figure 5:
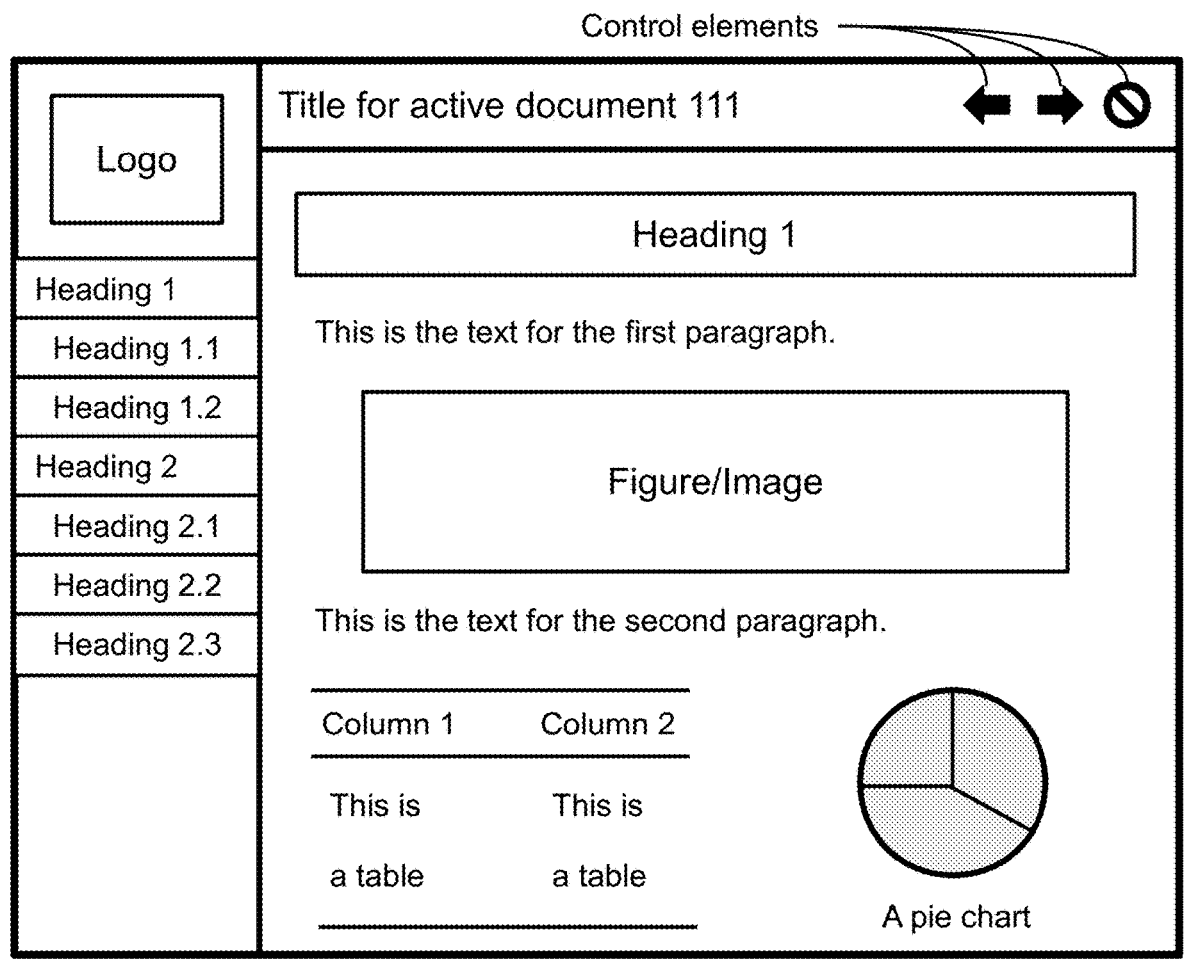
FIG. 5 is a schematic diagram of an active document display on the system of FIG. 3.

FIG. 4 illustrates one embodiment of a casual session, namely casual session 30 from FIG. 3, where an unprivileged user accesses the casual session through a Web browser. After satisfying any casual authentication and authorization requirements set up for casual session 30, the user is presented with a menu display that asks them to choose an active document that they would like to see from a list of active documents that have been added to the casual session. After choosing one of the active documents, say active document 111, the user is presented with a display rendered based on a format of the active document that is closest to a Web format. For example, if one of the formats of the active document is a Web page, then the Web page will form part of the overall display as illustrated in FIG. 5. The visual elements shown in FIG. 5 include those coming from active document 111 such as headings, figures, charts, tables, and paragraphs. Additionally, there may be control elements associated with the casual session that allows the user to easily navigate the current document, navigate to other active documents, or navigate back to the menu shown in FIG. 4. Through these displays, information contained within the active documents shall be conveyed to the unprivileged user.

In one embodiment, the system 10 is adapted to identify the unprivileged user and generate a casual session with an active document rendered according to a personalised render module of the unprivileged user. The personalised render module may be configured by an unprivileged user. In another embodiment, the personalised render module is created and evolve by the server based on the feedback and behaviour of the unprivileged user.

A privileged user may customize display elements in the various formats of an active document. For example, if a format of the active document is a Web page, then display elements may include typical Web user interface elements such as paragraphs of text, text boxes, check boxes, buttons, labels, charts, images, graphics, audio, and videos. Customizable attributes of display elements that a privileged user may change include display colour, font style, layout of major display elements, pop over positions, transparency level, and so forth.

A casual session may allow the download of rich text documents added to the casual session for unprivileged users to read outside of the system. Typically, rich text documents are verbose and full of technical and legal jargon, so it may be preferable for unprivileged users to start reading rich text documents after having viewed the corresponding active documents. As an example, a rich text document may contain many pages of detailed data in an appendix, it may be the case that the corresponding active document does not present the appendix to unprivileged users because the deluge of data may detract from the central message. However, the appendix may still be read by downloading the rich text document.

Another important function of a casual session may be to help privileged users manage the communication of content contained in active documents to unprivileged users. Several features are described here that are intended to achieve this function.

One benefit of an embodiment of the present invention is known as "Discussions". In one embodiment, the system 10 provides the Discussions feature which enables users in a casual session to attach annotations to any visual element of an active document display. Examples of visual elements that may be annotated include words, sentences, paragraphs, lists, headings, charts, figures or videos. Annotations are presented alongside the visual element that they are attached to. In one embodiment, an unprivileged user is reading an active document using a Web browser, the user may click on a sentence in the active document that they do not fully understand and annotate the sentence with questions, comments, images or drawings. Annotations may be view by privileged and unprivileged users who may then add to the annotations with their own answers, comments, images or drawings; thereby forming a point of discussion around the originally annotated sentence.

In another embodiment of the Discussions feature, annotations may only be created by a privileged user, who creates them around important concepts introduced in an active document. These annotations may contain in-depth explanations or illustrations of the introduced concepts, which will help unprivileged users in understanding the active document. Having in-depth explanations appear as annotations is advantageous in that it does not disrupt the main flow of the active document. These annotations may also contain figures, videos, or links to interactive games, which may present examples or simulations to further illustrate and explain difficult concepts or scenarios. Annotations may also link to other parts of the active document or to parts in other active documents to help users navigate multiple active documents and cross reference data.

In another embodiment of the present invention, the system 10 is adapted to provide a "Gates" feature. The Gates feature may be used to control the order in which active document content (in the form of visual elements) is presented in a casual session, as well as a means for privileged users to confirm that unprivileged users have satisfied certain criteria or conditions, such as understanding the information contained in the presented content, before taking a next action, including but not limited to show and hide content. A Gate is created by privileged users with a display component and a logic component; and it may be added to active documents within a casual session. The display component may appear as a visual element blending in with other visual elements in an active document display. The logic component determines whether the Gate is in a closed or open state. A closed Gate prevents visual elements that normally appear after the Gate from being shown or accessed, for example, by hiding text, images, and disabling links. An open Gate presents visual elements following it as per normal.

Embodiments of Gates include mandatory text, mandatory figure, or mandatory video, where the Gate must be viewed by an unprivileged user for a certain amount of time before visual elements following the Gate may be viewed or accessed. The logic component of the Gate keeps track of how long a user has viewed the display component of the Gate before changing its state from closed to open. Privileged users may configure the length of time before a Gate moves from closed to open.

Other embodiments of Gates include multiple choice question, number input question, and free text input question. A privileged user may add a question to an active document to force unprivileged users to answer the question before visual elements following it may be viewed or accessed. A question Gate changes its state from closed to open for a user as soon as the user correctly answers the question. These Gates help to ensure that unprivileged users do indeed understand the information presented in the content so far before allowing them to proceed further.

Yet another embodiment of Gates is the combination gate, which embeds one or more other Gates. The logic component of a combination gate changes its state from closed to open when all the embedded Gates' states switch to open.

In one embodiment of the present invention, the system 10 supports the management of a communication feature that is known as "State Transitions", where a casual session may store state data so that it can transition through multiple states to, for example, support business processes. In one embodiment of a casual session, the set of states may be: Ready the initial state upon creating the casual session before any rich text documents are added; Wait for Client after at least one rich text document and its corresponding active documents have been added to the casual session; Review after the first unprivileged user has accessed the casual session and started interacting with its active documents such as reading the documents, answering questions, and creating annotations, note at the same time privileged users may also be interacting such as replying to existing annotations; Client Confirmed after all unprivileged users have completed reading through all active documents contents and have indicated they no longer wish to interact with the casual session any further; and Completed after all privileged users have indicated there will be no further interactions with the casual session.

Privileged users may configure a casual session by attaching various actions to specific state transitions so that whenever those transitions take place, the attached actions are triggered. This enables, for example, functionality to send notification to specific users of the casual session. In one embodiment, when transitioning into the Review state, a notification may be sent to all privileged users notifying them that an unprivileged user has started their interactions with the casual session. Transitioning into the Client Confirmed state may result in notifications being sent to all privileged users notifying them that there are no further interactions expected from unprivileged users. Notifications can be in the form of emails, SMS, or push notifications to smart devices.

Another example of an action that may be attached to state transitions is the lock documents action, which prevents changes to rich text documents and active documents such as preventing annotations from being added, updated, or removed. In one embodiment, transitioning to the Completed state may trigger the lock documents action to make documents in a casual session read-only.

Yet another example is the disable unprivileged access action. In one embodiment of it, a casual session transitioning to the Completed state may trigger this action to disable access for unprivileged users. In another embodiment, a transition to the Completed state may trigger both the lock documents action for all active documents and the disable unprivileged access action for all unprivileged users in the casual session. The resulting casual session will provide read-only access to privileged users only to view the active documents, but not make any further changes.

In another embodiment, actions may also be attached to Gates so that actions attached to a Gate are triggered when the Gate switches from a closed to an open state. For example, an action that transitions a casual session from the Review state to the Client Confirmed state may be attached to a multiple choice question Gate. When the Gate switches from closed to open, the action will move the casual session into the Client Confirmed state if it was previously in the Review state.

In another embodiment, the system 10 supports the management of a communication feature named "Progression". Its purpose is to track the progress of all unprivileged users in terms of reading through active documents in a casual session and relay this progression data to privileged users. Examples of progression data include current active document and the visual elements in that document that each unprivileged user is currently viewing, the duration that they have spent on viewing the various visual elements of active documents, the Gates that each unprivileged user has opened, the number of tries that it took for them to open the Gates, the state transition diagram showing the history of the states that the casual session has been through, a summary of all annotations that have been created, and the number of times that one or more of the rich text documents have been downloaded. Progression data for a casual session is continuously collected by the system and a snapshot may be presented to privileged users whenever they request.

In one embodiment, progression data may be presented to privileged users in the form of one or more dashboards in a casual session. A dashboard may contain an arrangement of tiles that each displays a subset of the overall progression data. The tiles may only be showing summary data using charts, tables, or figures and may have hyperlinks that when activated transitions the dashboard into another view that drills into the details of the subset of data displayed by the tile.

In another embodiment, the progression data recorded by the system may be used to playback a simulation of activities made by an unprivileged user, such as which visual elements have been viewed or interacted with by the user, in which order, and the duration spent on each visual element. Looking at this playback of activities can provide privileged users with a better understanding of how the unprivileged user is progressing through the active documents, such as whether they spent an excessive amount of time on certain documents or sections. Privileged users may use this information to proactively revise hard-to-understand content, so as to improve the communication of information to unprivileged users.

In the context of the present invention, the words "include", "including" and the like are to be construed in their inclusive, as opposed to their exclusive, sense, that is in the sense of "comprising, but not limited to".

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrially applicable.

We claim:

1. A system for converting a rich text document into at least one active document suitable for consumption on a particular device system and/or operating system by human or machine, the system comprising:
   a server including a non-transitory non-volatile storage medium;
   the non-transitory non-volatile storage medium adapted to store at least one rich text document and at least one active document that has been converted from a rich text document format into an active document format;
   wherein the server is adapted to carry out the steps of:
   scanning and parsing the rich text document to extract structural elements and contents;
   scanning and parsing the rich text document to extract embedded metadata, wherein the extracted metadata describes the document structure;
   connecting structural elements and contents with the extracted metadata and the rich document to form a render data set, the render data set including the rich text document in an unconverted form, and wherein the structural elements and contents, and metadata are stored as one or more internal data model (IDM) data sets and the structural elements comprise one or more paragraphs, headings, bullet lists, number lists, hyperlinks, images, multimedia, mathematic equation, chemical structure, charts, tables, table rows and table cells and wherein the IDM data set is included in the render data set;
   sending the render data set to a configurable render module that converts the render data into multiple active documents, where at least one active document that is an amalgamation of multiple formats comprising at least one of PDF, several related Web pages grouped as a Web site, a video presentation, a cloud application programming interface (API);
   wherein the render module is adapted to be configurable through render module configurations, and the render module maintains a system-level configuration and multiple document-level configurations, such that there exists one document-level configuration for each render data set, and the configurations are able to control and alter aspects of a rendering process; and
   wherein the rendering module outputs the least one active document for display on a device.

2. A system of claim 1, wherein the at least one active document further includes one or more additional active documents that are is-realized in one or more of a range of formats, including PDF, several related Web pages grouped as a Web site, a video presentation, a cloud application programming interface (API), or any other suitable format or an amalgamation of one or more of the possible f-mats.

3. A system of claim 1, wherein the extraction of structural elements step is adapted to be configurable so that certain rich text document structures or elements are excluded in the IDM data set.

4. A system of claim 1, wherein the server is adapted to allow an authorized user to create one or more permanent sessions therein and become a privileged user of the one or more permanent sessions.

5. A system of claim 4, wherein one or more of the at least one rich text documents can be added to the one or more permanent sessions by the privileged user of the one or more permanent sessions, and a each of the at least one rich text documents added to the one or more permanent sessions may be marked by the privileged user as a revision of a source rich text document already in the one or more permanent sessions, and the one or more permanent sessions is adapted to maintain all revisions of the at least one rich text document as a version history.

6. A system of claim 5, wherein adding the at least one rich text documents in to one of the one or more permanent sessions comprises adding one or more corresponding active documents converted by the server, wherein the one of the one or more permanent sessions retains the source rich text document and maintains a link between source rich text document and the corresponding active documents thereof.

7. A system of claim 5, wherein the server is adapted to allow the privileged user to create one or more casual sessions associated with a permanent session of the one or more permanent sessions to communicate information contained in that permanent session's at least one rich text documents and corresponding active documents to other privileged or unprivileged users, wherein an unprivileged user is authenticated before being granted restricted access to a casual session of the one or more casual sessions, wherein the privileged user is authenticated by any one or more of password, security question, personal details, or biometrics.

8. A system of claim 7, wherein a casual session is associated with the privileged user, wherein the privileged user of one of the one or more permanent sessions who creates the casual session is identified as the casual session's first privileged user, and any other privileged users are identified as subsequent privileged users, and the server is adapted to allow the privileged user and the subsequent privileged users to configure and control access permissions of the casual sessions.

9. A system of claim 7, wherein the server is adapted to enable the privileged user to customize display elements in the multiple active documents, wherein the customized display elements comprise one or more of display color, font style, layout of major display elements, pop over positions, transparency level.

10. A system of claim 7, wherein the server is adapted to allow the privileged user to create display components, logic components, casual session state transitions, and access permissions linked to one or more pre-conditions or questions that augments the one or more corresponding active documents within the casual session, such that users are required to satisfy the pre-conditions or questions before the display components, logic components, state transitions, and access permissions may be accessed, wherein the access permissions grant or restrict access to the entire or parts of one of the one or more corresponding active documents.

11. A system of claim 7, wherein the server is adapted to track progress of unprivileged users who access the casual session, and continuously collect progression data in terms of their interactions with the one or more corresponding active documents in the casual session and relay the progression data to the privileged user.

12. A system of claim 11, wherein the progression data comprises any one or more of current one of the one or more corresponding active documents, visual elements viewed, duration on viewing visual elements, pre-conditions or questions satisfied by a user, number of tries in satisfying pre-conditions or questions, state transitions, a summary of annotations created, and the number of times that one or more of the one or more corresponding active documents have been downloaded.

13. A system of claim 11, wherein the server is adapted to present a snapshot of the progression data to the privileged user in the form of one or more dashboards or a playback simulation of activities that took place in the casual session, wherein a dashboard contains an arrangement of tiles that each displays a subset of the overall progression data, and the tiles may only be showing summary data using charts, tables, or figures, and may have hyperlinks that when activated transitions the dashboard into another view that drills into the details of the subset of data displayed by the tile.

* * * * *